(12) United States Patent
Camarillo Gonzalez et al.

(10) Patent No.: US 11,108,634 B2
(45) Date of Patent: Aug. 31, 2021

(54) METHOD FOR DEPLOYMENT OF A NODE

(71) Applicant: Telefonaktiebolaget LM Ericsson (publ), Stockholm (SE)

(72) Inventors: Gonzalo Camarillo Gonzalez, Helsinki (FI); Arjun Kamath, Espoo (FI); Ari Keränen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/496,765

(22) PCT Filed: Mar. 28, 2017

(86) PCT No.: PCT/EP2017/057318
§ 371 (c)(1),
(2) Date: Sep. 23, 2019

(87) PCT Pub. No.: WO2018/177511
PCT Pub. Date: Oct. 4, 2018

(65) Prior Publication Data
US 2020/0036590 A1 Jan. 30, 2020

(51) Int. Cl.
*H04M 3/00* (2006.01)
*H04L 12/24* (2006.01)
(Continued)

(52) U.S. Cl.
CPC ......... *H04L 41/0846* (2013.01); *H04W 8/005* (2013.01); *H04W 24/02* (2013.01);
(Continued)

(58) Field of Classification Search
CPC ......... H04M 15/8033; H04M 1/72569; H04M 3/42102; H04M 3/42238; H04M 15/09;
(Continued)

(56) References Cited

U.S. PATENT DOCUMENTS 9,778,235 B2 * 10/2017 Gettings ............... G01N 33/00
2010/0103940 A1 * 4/2010 van Greunen ........ H04L 67/104
370/400
(Continued)

FOREIGN PATENT DOCUMENTS

CN       105873065    *  2/2019  ............ H04W 64/00
EP       2252100 A1      11/2010

OTHER PUBLICATIONS

Armknecht, F. et al., "A Formal Foundation for the Security Features of Physical Functions", 2011 IEEE Symposium on Security and Privacy, May 22, 2001, pp. 1-16, IEEE.
(Continued)

*Primary Examiner* — Joseph Arevalo
(74) *Attorney, Agent, or Firm* — Sage Patent Group

(57) ABSTRACT

A method (10) for deployment of a node (2) in a wireless network (1) is provided. The method (10) is performed in the N node (2) and comprises: receiving (11) configuration data from two or more sets of nodes (31, . . . , 3N; 4) of the wireless network (1), N determining (12) a first number of nodes (31, . . . , 3N) of the first set of nodes (31, . . . , 3N) providing first configuration data and a second number of nodes (4) of the second set of nodes (4) providing second configuration data, and determining (13), based on the first and second number of nodes (31, . . . , 3N; 4), one of the first and second configuration data for use in configuration of the node (2). A node (2), a computer program and a computer program product are also provided.

12 Claims, 3 Drawing Sheets

(51) Int. Cl.
*H04W 8/00* (2009.01)
*H04W 24/02* (2009.01)
*H04W 64/00* (2009.01)
*H04W 72/04* (2009.01)
*H04W 52/02* (2009.01)
*H04W 92/20* (2009.01)

(52) U.S. Cl.
CPC ..... *H04W 64/003* (2013.01); *H04W 72/0406* (2013.01); *H04W 52/0216* (2013.01); *H04W 92/20* (2013.01)

(58) Field of Classification Search
CPC .......... H04M 15/82; H04M 1/04; H04M 1/67; H04M 1/72572; H04M 2250/06; H04M 15/39; H04M 15/43; H04M 15/723; H04M 15/765; H04M 15/7652; H04M 15/77; H04M 15/80; H04M 1/0214; H04M 1/185; H04M 1/658; H04M 1/7253; H04M 1/72552; H04M 2201/405; H04M 2203/4509; H04M 2250/04; H04M 2250/12; H04M 2250/16; H04M 3/42229; H04M 3/5307; H04M 3/53325; H04M 7/004
USPC .... 455/419, 571, 411, 405, 296, 440, 67.11, 455/63.2, 436, 522, 12.1, 454, 418, 435.2, 455/452.1, 456.1, 456.2, 414.1, 449, 450, 455/500, 68, 430, 562.1, 437
See application file for complete search history.

(56) References Cited

U.S. PATENT DOCUMENTS

| | | | |
|---|---|---|---|
| 2012/0045204 A1* | 2/2012 | Beshai | H04J 14/0284 398/45 |
| 2012/0203881 A1* | 8/2012 | Suto | H04L 41/0823 709/223 |
| 2013/0215879 A1* | 8/2013 | Rittner | H04B 7/2656 370/347 |
| 2013/0276058 A1* | 10/2013 | Buldas | H04L 63/0876 726/2 |
| 2014/0064144 A1* | 3/2014 | Beshai | H04L 45/60 370/254 |
| 2015/0113001 A1* | 4/2015 | Prieto | H04L 41/0853 707/748 |
| 2015/0256401 A1* | 9/2015 | Zinger | H04L 41/14 370/401 |
| 2016/0253523 A1* | 9/2016 | Kroonmaa | G06F 21/64 726/26 |
| 2016/0309345 A1* | 10/2016 | Tehrani | H04W 72/0426 |
| 2017/0064557 A1 | 3/2017 | Alsohaily et al. | |
| 2018/0198626 A1* | 7/2018 | Kroonmaa | H04L 9/0637 |

OTHER PUBLICATIONS

Brik, V. et al., "Wireless Device Identification with Radiometric Signatures", MobiCom 2008, Sep. 14, 2008, pp. 1-13, ACM.
Sun, T. et al., "Reliable Sensor Networks for Planet Exploration", 2005 IEEE Networking, Sensing and Control Proceedings, Mar. 19, 2005, pp. 1-6, IEEE.

* cited by examiner

METHOD FOR DEPLOYMENT OF A NODE

TECHNICAL FIELD

The technology disclosed herein relates generally to the field of wireless networks, and in particular to a method for deployment of a node in a wireless network, a node, computer program and computer program product.

BACKGROUND

Internet of things (IoT) interconnects various identifiable devices in an existing Internet infrastructure. The devices may, for instance, be sensor nodes of a wireless sensor network used for monitoring and controlling an environment. An operator may want to add nodes in an IoT system with many nodes that are already-deployed in the field. The new nodes then need to be configured, typically in the same way as the existing nodes. Data to be configured comprises network-level information, e.g., radio channels to use, and application-level information, e.g., IoT server address to which measurements and alarms is to be sent, management server address etc.

Existing IoT systems use preconfigured enrollment servers to provide the network-level and application-level configuration information. In order to get the network-level information, the new node contacts a local enrollment server of the local network using a default radio channel. The local enrollment server provides the new node with its network-level configuration. The new node is preconfigured with the address of a remote enrollment server, which is typically located somewhere on the Internet, in order to get the application-level configuration information. The new node trusts the enrollment servers because the new node's factory configuration includes master keys, which may, for instance, be public keys of the enrollment servers or symmetric keys shared with the enrollment servers.

To include keys in the new nodes when they are manufactured has some drawbacks. For instance, the keys cannot be changed if they are compromised. Further, to pre-configure the keys in the nodes and enrollment servers before the start of a given deployment is time consuming. In addition, deploying an enrollment server in the local network is often time consuming, and can also be expensive. Still further, the enrollment server represents a single point of failure and may therefore be a target for a malicious attacker.

SUMMARY

An objective of the present disclosure is to address and improve various aspects for introducing new nodes in an already deployed wireless network, such as e.g. a sensor network. Some particular objectives are to enable adding of a node in an easy, safe and cost-efficient manner. These objectives and others are achieved by the method, node, computer programs and computer program products according to the appended independent claims, and by the embodiments according to the dependent claims.

The objective is according to an aspect achieved by a method for deployment of a node in a wireless network. The method is performed in the node and comprises:

receiving configuration data from two or more sets of nodes of the wireless network, determining a first number of nodes of the first set of nodes providing first configuration data and a second number of nodes of the second set of nodes providing second configuration data, and determining, based on the first and second number of nodes, one of the first and second configuration data for use in configuration of the node.

The method provides a number of advantages. For instance, the addition of new nodes to a given deployment and their configuration can be performed in a fully automatic way even in the presence of attackers, which gives an easy, secure and cost-efficient way of introducing new nodes. The method does not require the deployment of a local enrollment server to provide nodes with network-level configuration data. Further, the method also avoids the need to preconfigure the address of a remote enrollment server to provide nodes with application-level configuration data.

The objective is according to an aspect achieved by a computer program for a node. The computer program comprises computer program code, which, when run on at processing circuitry of the node causes the node to perform the method as above.

The objective is according to an aspect achieved by a computer program product comprising a computer program as above and a computer readable means on which the computer program is stored.

The objective is according to an aspect achieved by a node for deployment in a wireless network. The node is configured to: receive configuration data from two or more sets of nodes of the wireless network, determine a first number of nodes of the first set of nodes providing first configuration data and a second number of nodes of the second set of nodes providing second configuration data, and determine, based on the first and second number of nodes, one of the first and second configuration data for use in configuration of the node.

Further features and advantages of the embodiments of the present teachings will become clear upon reading the following description and the accompanying drawings.

DETAILED DESCRIPTION

Figure 1:
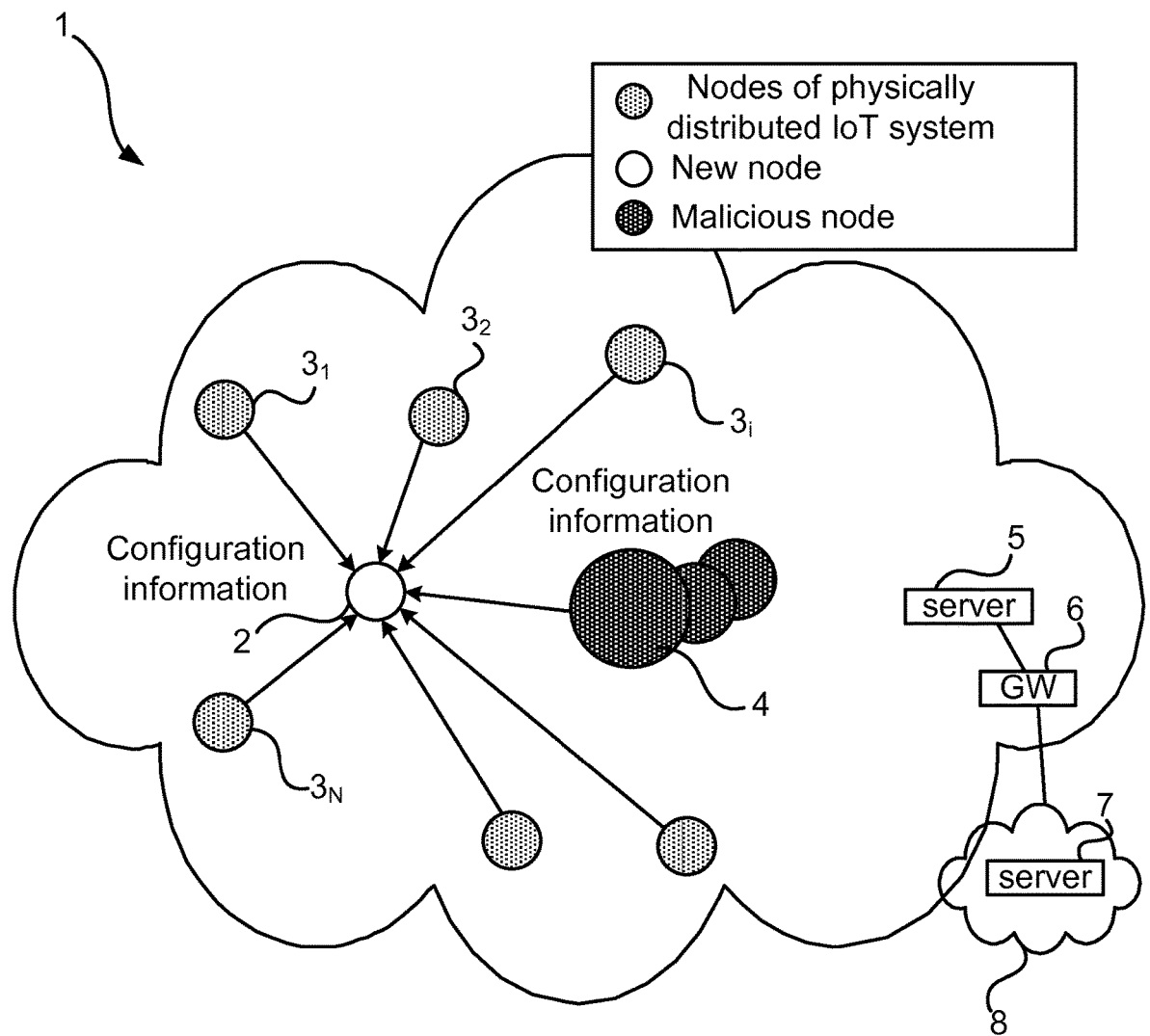
FIG. 1 illustrates schematically an environment in which embodiments according to the present teachings may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, according to the present teachings, a new node decides what configuration information (denoted configuration data in the following) to trust by using a consensus mechanism based, for instance, on the highest number of different devices providing the same configuration data. The new node may, for instance, count individual nodes by checking their physical locations and/or radio fingerprints.

FIG. 1 illustrates schematically an environment in which embodiments according to the present teachings may be implemented. A wireless network 1 is shown to comprise a number of nodes $3_1, 3_2, \ldots, 3_i$. The wireless network 1 may be a physically distributed IoT system, i.e. the nodes of the $3_1, 3_2, \ldots, 3_i$ may be physically distributed in an environment, e.g. in a home environment or in an industrial environment, and may be configured to communicate e.g. measurement values to a server 8 of an external data network 8, e.g. Internet. The nodes $3_1, 3_2, \ldots, 3_i$ may, for instance, comprise wireless devices such as sensors (e.g. temperature sensors), household appliances, surveillance cameras etc. that are capable of wireless communication in a wireless home network. The wireless home network may, for instance, be a wireless local area networking adopting a standard for Wi-Fi. As another example, the nodes $3_1, 3_2, \ldots, 3_i$ may comprise field devices, routers, controllers, sensors etc. of an industrial plant, e.g. process plant. The wireless industrial plant may, for instance, use a wireless standard such as Wireless Highway Addressable Remote Transducer Protocol (WirelessHART). The wireless network 1 thus comprises a number of deployed nodes $3_1, 3_2, \ldots, 3_i$, which may have been bootstrapped in any known manner.

A new node 2, i.e. a node 2 to be deployed in the already existing wireless network 1, and one or more rogue nodes 4 (one indicated at reference numeral 4) are also shown in the FIG. 1. The rogue node 4 is a node placed in the wireless network 1 by, for instance, an attacker, while the new node 2 is a node added legitimately to the wireless network 1.

The new node 2 will need network-level configuration data, which may be provided by a local enrollment server 5 of the wireless network 1. The new node 2 will also need an address of a remote enrollment server 7, which will provide application-level configuration data. The remote enrollment server 7 may be a server of an external data network 8, such as, for instance, a server of in a data center providing cloud services.

The wireless network 1 may further comprise one or more gateways 6 for enabling the nodes $3_1, 3_2, \ldots, 3_i$ that are not directly connected to the data network 8 (e.g. Internet) to reach cloud services (e.g. reporting measurement values and receiving configuration data). It is thus noted that the nodes $3_1, 3_2, \ldots, 3_i$ may be directly or indirectly connected to the Internet (or other external data network).

The new node 2 that is being deployed needs, as mentioned in the background section, to obtain its configuration data from somewhere. According to the present teachings advantage is taken of the fact that the number of already-deployed nodes $3_1, 3_2, \ldots, 3_i$ in the field, i.e. in the wireless network 1, is typically rather high and that it will be difficult for an attacker to deploy as many rogue nodes 4.

When the new node 2 is deployed it will inquire a plurality of the already-deployed nodes $3_1, 3_2, \ldots, 3_i$ for the configuration data to use. This inquiring may, for instance, be performed using a default radio channel. In response to the inquiry, the new node 2 will receive correct (i.e. intended and desired) configuration data from nodes approved by the operator of the wireless network 1 (such nodes hereinafter being referred to as good nodes $3_1, 3_2, \ldots, 3_i$), but also potentially incorrect configuration data from rogue nodes 4. To resolve this ambiguity of which configuration data to use, a consensus mechanism (e.g., majority voting) is implemented, whereby the new node 2 will trust the configuration data provided e.g. by the highest number of different nodes or by the most trustworthy nodes as will be described more in detail later.

The new node 2 needs to be able to distinguish between several different good nodes $3_1, 3_2, \ldots, 3_i$ that are sending information (e.g. configuration data) and a single/few rogue node(s) 4 pretending to be one or several different nodes sending information. To address and solve this problem, use is made of features wherein the new node 2 uses e.g. the physical location and/or radio fingerprints of the nodes $3_1, 3_2, \ldots, 3_i, 4$ sending configuration data in order to differentiate and count them.

Two examples on how to perform the physical location detection are audio source localization and radio direction finding techniques. If audio source localization is used, the nodes $3_1, 3_2, \ldots, 3_i, 4$ emit sounds, which may or may not be audible for humans (e.g., ultra sounds). Radio direction finding techniques to determine the physical location of transmitters (which would be the nodes sending configuration data when applied in the embodiments of the present teachings) are known and used in different technical fields, such as in radio navigation systems for boats and aircrafts. Regarding audio source localization, there are, for instance, multimedia applications that measure properties of surround sound in order to determine a direction of a transmitter.

As an example on how to differentiate the nodes sending the configuration data or other information, radio fingerprinting can be mentioned. Radio fingerprinting may use a Physically Unclonable Function (PUF), which is a function embodied in a physical device (e.g. an integrated circuit (IC) or chip). The PUF exploits the inherent process variations in the physical device to produce a response which is easy to compute by the PUF, but hard to predict for a PUF-external entity. Even if repeating the manufacturing process that fabricated an individual PUF it is practically impossible to duplicate it, since various parameters, e.g. temperature, material impurities, etc. may vary during the manufacturing affecting the individual PUFs differently. The PUFs hence use small variations in the physical properties of devices to derive security material that is hard to clone or counterfeit. The PUF may, as mentioned, be used to perform radio fingerprinting. The nodes $3_1, 3_2, \ldots, 3_i$ may run a function, the result of which depends on the physical properties of its radio module. In short, each radio device has unique characteristics, which are referred to as its fingerprint. A radio fingerprint can be detected by a receiver and is very hard to fake, since a PUF is practically impossible to duplicate.

Using the physical location detection methods or the radio fingerprinting techniques described above, or both, the new node 2 that is to be deployed can count the number of different nodes $3_1, 3_2, \ldots, 3_i, 4$ that are providing it with a given configuration data. As mentioned earlier, the new node 2 may trust the configuration data obtained based on the number of different nodes, e.g. it may trust the configuration data provided by the highest number of different nodes.

While the method, in its various embodiments, may not provide complete security against all attacks, it reduces the attack surface considerably and, thus, is a feasible solution in many IoT environments where it is important to have an easy way for bootstrapping nodes. Additionally, the method allows for making tradeoffs between the required level of security, and the cost of the hardware and software capabilities needed to reach such security level. For instance, a directional antenna may be more expensive but provides more accurate location information than omnidirectional antennas.

Various aspects of a method for deploying the new node 2 in the wireless network 1 are described in the following.

The new node 2, e.g., a sensor, is to join the wireless network 1. The new node 2 therefore needs network-level and application-level configuration data. The new node 2 connects to a bootstrapping channel, which may, for instance, be a default radio channel, in order to get the network-level configuration data and an address of the remote enrollment server 7, which will provide application-level configuration data. In a deployment where the nodes $3_1, 3_2, \ldots, 3_i$ are active all the time, the new node 2 may broadcast a request so that other nodes $3_1, 3_2, \ldots, 3_i$, send their configuration data to it. In a deployment where the nodes $3_1, 3_2, \ldots, 3_i$ are sleeping most of the time (i.e. are in a so-called sleep mode), the new node 2 may simply listen to the channel. When the other nodes $3_1, 3_2, \ldots, 3_i$ wake up, e.g., to send an hourly measurement, they may broadcast their configuration data, or they may then be requested by the new node 2 to broadcast their configuration data. In either case, after a certain period of time, the new node 2 receives configuration data from a plurality of nodes $3_1, 3_2, \ldots, 3_i$. One or more rogue nodes 4 may also be sending configuration data in same or similar ways.

The new node 2 receives the same (correct) configuration data from a plurality of node considered to be good nodes $3_1, 3_2, \ldots, 3_i$. The new node 2 may, as noted, also have received incorrect configuration data from one or several rogue nodes 4. A single rogue node 4 may have sent the same incorrect configuration data several times pretending to be different nodes.

The new node 2 should only trust the configuration data that has been determined to be from the good nodes $3_1, 3_2, \ldots, 3_i$, e.g., the configuration data received from the highest number of different nodes $3_1, 3_2, \ldots, 3_i$. The new node 2 may consider nodes $3_1, 3_2, \ldots, 3_i$ to be different if they were considered by the new node 2 to be located at different physical locations when they sent their configuration data, or if the radio fingerprints of the nodes $3_1, 3_2, \ldots, 3_i$ are determined by the new node 2 to be different, or both. One or both of these ways of identifying the transmitting nodes $3_1, 3_2, \ldots, 3_i$ can be used, depending e.g. on the level of security needed, and depending on whether radio fingerprinting and/or location detection can be reliably used by the joining new node 2.

For every different (set of) configuration data that the new node 2 has received, the new node 2 may check the physical location and/or radio fingerprint of all the nodes $3_1, 3_2, \ldots, 3_i$, 4 that sent the same configuration data. The new node 2 may determine their physical location by, for example, using radio direction finding (e.g., Multiple-Input-Multiple-Output, MIMO, techniques) or audio source localization techniques. For radio fingerprinting known methods can be used. Each node (in particular transmitter thereof) will, for instance, have a rise time signature that is hard imitate, since it is affected by (small) variations of component values during manufacture (as described earlier for PUFs). When a rise time signature is captured and assigned to a callsign, the use of different nodes (transmitters thereof) using the same callsign is easy to detect.

Once having determined the number of different nodes sending e.g. first configuration data and second configuration data, the new node 2 will trust the configuration data as determined by a consensus mechanism, e.g. the configuration data that was sent by a higher number of different nodes $3_1, 3_2, \ldots, 3_i$.

The new node 2 may also use a confidence level for each configuration data, depending on how well the location and/or fingerprint detection can be performed. As an example, some location methods provide a better spatial resolution than others. The new node 2 can compare the confidence level with a level of confidence required by the application (e.g., smart home vs. industrial IoT) and/or the type of new node 2 and decide whether or not it can use the information. Regarding the type of node, if the nodes comprise a temperature sensor and a door lock, it may, e.g., be acceptable for the temperature sensor to have lower confidence level than the door lock.

The configuration data may comprise information about a remote enrollment server 7 on the Internet 8 that can be contacted in order to obtain application-level configuration and authorization (e.g., to provide the joining new node 2 with encryption keys). The remote enrollment server 7 may authorize the new node 2 in different ways. For example, the remote enrolment server 7 may only authorize new nodes within a certain time window starting when new nodes are actually being deployed. Depending on the requirements of the application, the remote enrollment server 7 may apply more or less stringent authorization policies.

The various features and embodiments that have been described can be combined in many different ways, examples of which are given in the following with reference first to FIG. 2.

Figure 2:
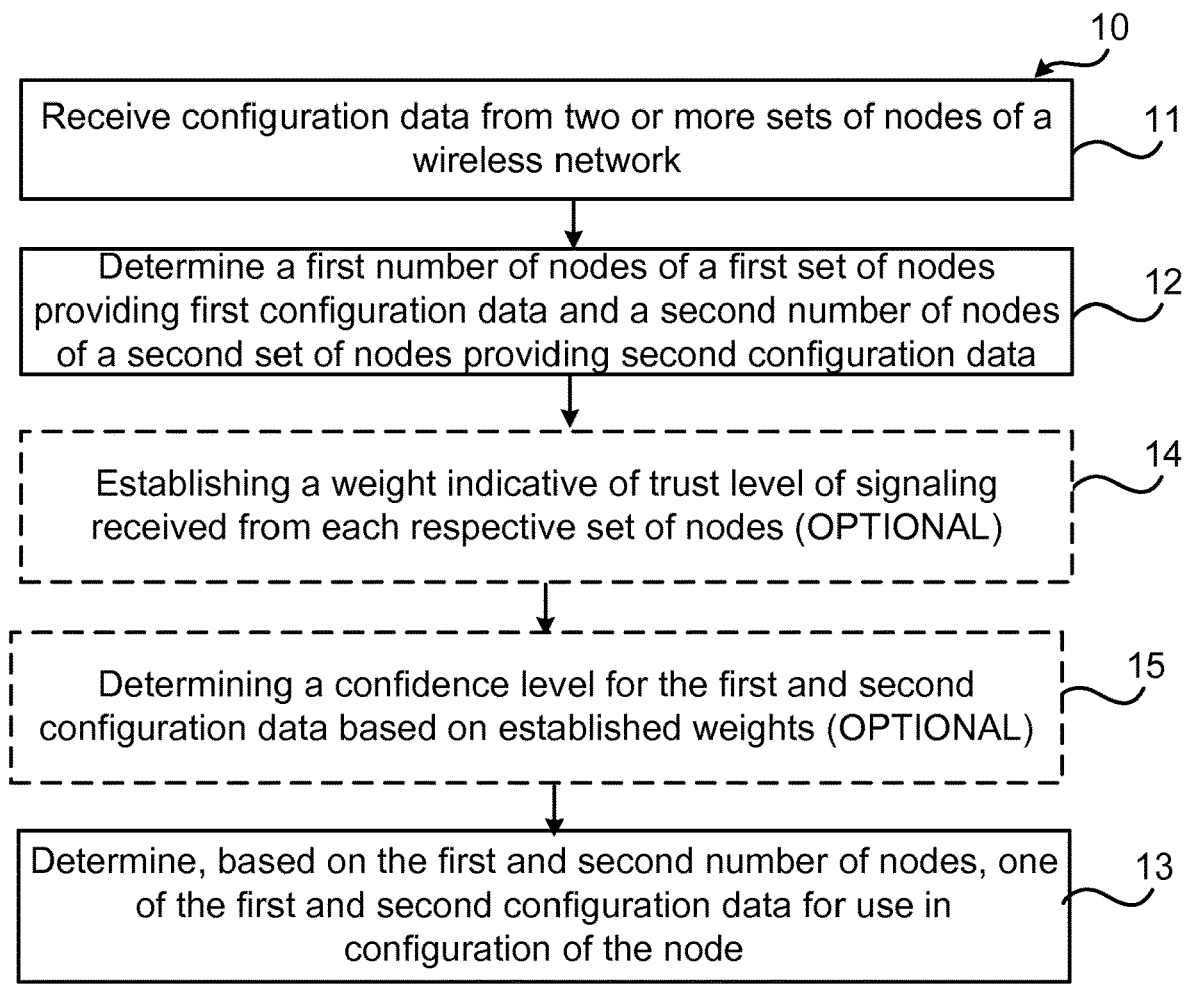
FIG. 2 illustrates a flow chart over steps of an embodiment of a method in a node in accordance with the present teachings.

FIG. 2 illustrates a flow chart over steps of an embodiment of a method in a node to s be deployed in accordance with the present teachings.

A method to is provided for deployment of a node 2 in a wireless network 1. The method to may be performed in any node 2 capable of wireless communication in the wireless network 1, as exemplified earlier (e.g. with reference to FIG. 1), e.g. capable of Wi-Fi communication or Bluetooth communication.

The method to comprises receiving 11 configuration data from two or more sets of nodes $3_1, \ldots, 3_N$, 4 of the wireless network 1.

The method 10 comprises determining 12 a first number of nodes $3_1, \ldots, 3_N$ of the first set of nodes $3_1, \ldots, 3_N$ providing first configuration data and a second number of nodes 4 of the second set of nodes 4 providing second configuration data. The new node 2 may differentiate the transmitting nodes $3_1, \ldots, 3_N$, 4 e.g. by means of location determination or based on radio fingerprints of the transmitting nodes, or both, and hence determine the first and second number of nodes.

The method to comprises determining 13, based on the first and second number of nodes $3_1, \ldots, 3_N$; 4, one of the first and second configuration data for use in configuration of the node 2.

At least one of the sets of nodes comprises one or more nodes. That is, in one scenario all the nodes are transmitting the same configuration data (in particular, the first configuration data) and the node 2 then uses this configuration data at its deployment. In another scenario, the first set of nodes comprises a first number of nodes (e.g. 3 or more), and the second set of nodes comprises a second number of node (e.g. 1). In this scenario, the second set of nodes may comprise e.g. a single malicious node that sends the second configuration data and all the other nodes (more than one) send the first configuration data. The determining 13 may then simply comprise determining, based on the first number of nodes being larger than the second number of nodes, that the first configuration data is to be used. The new node 2 may then use the configuration data in its configuration. The configuration data may, for instance, comprise information about a remote enrollment server on the Internet that can be contacted in order to get application-level configuration and authorization.

In an embodiment, the determining 13 the configuration data is further based on data received from a third set of nodes, comprising one or more nodes. In such embodiments, the third set of nodes may, for instance, comprise a node from a third party sending data. In the determining 13, the data from the third set of nodes may be required in combination with configuration data from a first set of nodes, in order for the deployment to be made. For instance, the third set of nodes may comprise a particular smart phone sending an approval of the deployment of the node, or the third set of nodes may comprise a mobile network broadcasting entity (e.g. a gNB of a 5G mobile network) that is broadcasting data needed for the deployment of the node 2. Since a node connected to a mobile network is trusted by the mobile network it can be considered as more trusted node in general. One way to ensure that a node is trusted by a mobile network is to use Generic Bootstrapping Architecture (GBA) method for authenticating a node belonging to a mobile network. These embodiments, using data from a third set of nodes, may for instance be implemented in order to increase security and/or control of node configurations in the wireless network.

In some embodiments, the determining 13 the configuration data for use in configuration comprises determining the configuration data received from highest number of nodes $3_1, \ldots, 3_N$; 4.

In various embodiments, the determining 13 the configuration data for use in configuration comprises establishing 14 a weight indicative of trust level of signaling received from each respective set of nodes $3_1, \ldots, 3_N$; 4. This is an optional step, as indicated in the figure by text and the box being drawn with dashed lines. This step may, for instance, be performed in connection with the node 2 determining the first and second number of nodes (step 12) and/or when determining (in step 13) which configuration data to use. As has been described, some of the nodes $3_1, \ldots, 3_N$, 4 can, for instance, be more accurately identified than other or the physical location for some nodes $3_1, \ldots, 3_N$, 4 can be determined more accurately than other. The establishing 14 may, for instance, comprise giving higher trust, hence higher weight, to signaling received from a first type of node than a second type of node as exemplified earlier. A confidence level for each set of configuration data can then be determined. As a particular example, the new node 2 may receive configuration information from a first set of nodes comprising, for instance, 10 nodes, each of which provides a different radio fingerprint (which, as described earlier, is difficult to forge). Additionally, the new node 2 may receive alternative configuration information from a second set of nodes that appears to comprise 12 nodes that do not provide their radio fingerprints. Instead, the new node 2 identifies the latter nodes by using a radio location technique that provides a lower level of accuracy. The new node 2 will trust the 10 nodes providing radio fingerprints instead of the 12 nodes that do not provide them. A single rogue node could pretend to be several nodes sending the same configuration information, but such cases may be identified e.g. by the radio location technique, revealing that the configuration information comes from same location.

In a variation of the above embodiment, the method comprises determining 15 a confidence level for the first and second configuration data based on the established weights.

In various embodiments, the determining 13 one of the first and second configuration data is further based on one or both of: physical location determination of the nodes of the one or more set of nodes $3_1, \ldots, 3_N$; 4 and radio signaling fingerprint determination of the nodes of the one or more sets of nodes $3_1, \ldots, 3_N$; 4.

In such embodiments, the determining one of the first and second configuration data for use is based on the number of nodes of each set of nodes and on one or both of physical location determination of the nodes and radio signaling fingerprint determination. For each node, a certain weight may be given to the configuration data depending on the accuracy with which the configuration data is received. The weight may in turn be dependent on how the signaling is made, e.g. configuration data sent by directional antennas may be received at a higher power and with higher accuracy, and would then get a higher weight. There are also various other possible combinations on how to determine which configuration data to use.

In various embodiments, the determining 12 the first number of nodes $3_1, \ldots, 3_N$ and the second number of nodes 4 comprises identifying each of the nodes $3_1, \ldots, 3_N$; 4 by determining a respective direction of signaling received from each of the nodes $3_1, \ldots, 3_N$; 4. For such embodiments, the node 2 may, for instance, comprise an antenna device 24 capable of determining a direction of a received signal, e.g. a multi-antenna device. The signaling may, for instance, comprise the configuration data.

In various embodiments, the determining 12 the first number of nodes $3_1, \ldots, 3_N$ and the second number of nodes 4 comprises identifying each of the nodes $3_1, \ldots, 3_N$; 4 based on audio signaling received from each of the nodes $3_1, \ldots, 3_N$; 4. The node 2 may comprise means so as to be able to detect the direction of sound or other context information in order to defend against rogue nodes that are located remotely. For example, if the new node 2 plays a sound, nodes $3_1, \ldots, 3_N$ in its vicinity will be able to record it and play it back to the new node 2, showing that they are physically close to it. A remote node will not be able to "listen" to the sound. As another example, the nodes $3_1, \ldots, 3_N$ in the vicinity of the new node 2 may listen to ambient sound and send a recording of that. The new node 2 may, based on the received recording, determine if the nodes $3_1, \ldots, 3_N$ are indeed in its vicinity, since remote (rouge) nodes would not be able to produce a recording of the same sound. It is noted that a fingerprint of such recordings may be sent instead of the recording itself. Examples of such fingerprint comprise: using the ten highest frequencies that are detected, using time instances of impulses above a threshold in a given frequency range.

In various embodiments, the determining 12 the first number of nodes $3_1, \ldots, 3_N$ and second number of nodes 4 comprises identifying for each node $3_1, \ldots, 3_N$; 4 a radio fingerprint based on signaling received from each of the nodes $3_1, \ldots, 3_N$; 4. As before, the signaling may, but need not, be the signaling comprising the configuration data. An example of signaling that can be used but which does not necessarily comprise configuration data is reference signals.

In various embodiments, the receiving 11 configuration data comprises receiving a hash value of the configuration data. It is noted that the node 2 needs to receive complete configuration data at least once, and the other transmissions may use just a hash. In preferred embodiments, the hash is a (cryptographically) secure hash, e.g., Secure Hash Algorithm (SHA)-256 or SHA-3, in order to render possible attacks more difficult. Secure hashes, e.g., one-way functions, may be used e.g. to reduce air interface traffic, so that the nodes $3_1, \ldots, 3_N$ send the hash of the configuration data instead of the whole configuration data. It is noted that the size of the hash is significantly smaller than the size of the configuration data. All nodes $3_1, \ldots, 3_N$ send the hash of the configuration data to the new node 2. The new node 2 decides which hash is to be trusted, e.g., trusting the hash sent by a higher number of nodes or based on weights as has been described. The new node 2 may ask any node $3_1, \ldots, 3_N$ that sent the chosen hash to send the configuration data corresponding to this chosen hash.

In some embodiments, the received hash may be matched to configuration data that the node 2 has received elsewhere (i.e. not from other nodes in the wireless network 1). For example, the configuration data may be cached from an earlier on boarding session or it may be part of the firmware.

Advantages of embodiments in which hashes are used comprise e.g. reduced air interface traffic and also the processing capacity and processing time required in the new node 2.

In various embodiments, the determining 13 comprises comparing the received hash values and determining the configuration data corresponding to the hash value received from highest number of nodes.

In various embodiments, the node 2 wakes up from a sleep mode based on one of: recognizing a predefined trigger, a received wake-up signal and entering a wake-up period. The sleep mode is typically part of a power-saving function, and the wake-up period is then a period during which the node "wakes up" and listens to signaling. The wake-up period is followed by a sleep period. Some of the existing nodes $3_1, \ldots, 3_N$ may be mostly asleep but could be woken up on receiving a specific signal on their network interfaces. For example, the new node 2 may broadcast a wake-up signal that wakes up the existing nodes $3_1, \ldots, 3_N$ and which then send their configuration data. As another example, if a third set of nodes (described earlier) is used, such node(s) may provide such a wake-up signal to the existing nodes $3_1, \ldots, 3_N$. The wake-up signal may, for both examples, be considered as a predefined trigger.

The nodes $3_1, \ldots, 3_N$, 4 of the one or more sets of nodes may, for instance, be configured to go online or offline periodically or upon receiving a triggering signal (e.g. as exemplified above) and then send their respective configuration data. The new node 2 to be deployed may gather the configuration data (or hashes of it) from several sets of nodes over a period of time where the nodes $3_1, \ldots, 3_N$, 4 wake up and go to sleep. The nodes $3_1, \ldots, 3_N$, 4 sending configuration data may be configured with a wake-up capability so as to be woken up when a configuration is considered to be needed. For instance, the node 2 to be deployed may, as exemplified above, send a triggering signal. The node 2 to be deployed may be configured with the described predefined trigger, such that all nodes $3_1, \ldots, 3_N$ supposed to provide the configuration data are triggered by the same trigger and making them to wake up and engage in the deployment process. In some embodiments, the configuration data may be sent out in an irregular pattern known to the node 2 to be deployed.

Figure 3:
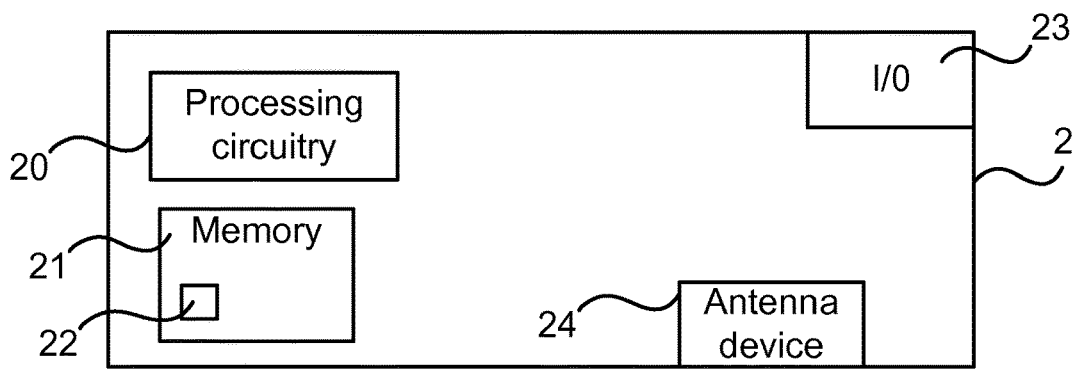
FIG. 3 illustrates schematically a node and means for implementing embodiments of the present teachings.

FIG. 3 illustrates a node to be deployed and means for implementing embodiments of the present teachings.

The node 2 is a node 2 to be deployed in a wireless network, and comprises processing circuitry 20, which may be any combination of one or more of a suitable central processing unit (CPU), multiprocessor, microcontroller, digital signal processor (DSP), etc., capable of executing software instructions stored in a computer program product 21, e.g. in the form of a storage medium 21. The processing circuitry 20 may further be provided as at least one application specific integrated circuit (ASIC), or field programmable gate array (FPGA).

The processing circuitry 20 is configured to cause the node 2 to perform a set of operations, or steps, e.g. as described in relation to FIG. 2. For example, the storage medium 21 may store the set of operations, and the processing circuitry 20 may be configured to retrieve the set of operations from the storage medium 21 to cause the node 2 to perform the set of operations. The set of operations may be provided as a set of executable instructions 22. The processing circuitry 20 is thereby arranged to execute methods as disclosed herein.

The storage medium 21 may also comprise persistent storage, which, for example, can be any single one or combination of magnetic memory, optical memory, solid state memory or even remotely mounted memory.

The node 2 may also comprise an input/output device 23 for communicating with other entities and devices. The input/output device 23 may be an interface and may, for instance, comprise a protocol stack, for communication with other devices (e.g. other nodes of the wireless network 1) or entities. The input/output device 23 may be used for receiving data input, e.g. configuration data from other nodes. The node 2 may also, once deployed, become a node among the first set of nodes, and the input/output device 23 may then also be used for outputting data, e.g. sending configuration data when an additional node is to be deployed. Once deployed, and depending on which type of node it is, the node 2 may use the input/output device 23 for sending data/receiving data to/from an application server on Internet. The input/output device 23 may comprise receiving circuitry and transmitting circuitry. The node 2 may also comprise an antenna device 24 which may, for instance, be a directional antenna.

A node 2 for deployment in a wireless network 1 is provided. The node 2 is configured to:

receive configuration data from two or more sets of nodes $3_1, \ldots, 3_N$; 4 of the wireless network 1, determine a first number of nodes $3_1, \ldots, 3_N$ of the first set of nodes $3_1, \ldots, 3_N$ providing first configuration data and a second number of nodes 4 of the second set of nodes 4 providing second configuration data, and determine, based on the first and second number of nodes $3_1, \ldots, 3_N$; 4, one of the first and second configuration data for use in configuration of the node 2.

The node 2 may be configured to perform the above steps, and implement any of the described embodiments of the method, e.g. by comprising one or more processors 20 and memory 21, the memory 21 containing instructions executable by the processor 20, whereby the node 2 is operative to perform the steps.

In an embodiment thus, a node 2 for deployment in a wireless network 1 is provided. The node 2 comprises one or more processors 20 and memory 21, the memory 21 containing instructions executable by the processor 20, whereby the node 2 is operative to: receive configuration data from two or more sets of nodes of the wireless network, determine a first number of nodes of the first set of nodes providing first configuration data and a second number of nodes of the second set of nodes providing second configuration data, and determine, based on the first and second number of nodes, one of the first and second configuration data for use in configuration of the node.

The node 2 may be configured to perform the method as described and in particular any of the embodiments thereof.

In an embodiment, the node 2 is configured to determine the configuration data based further on data received from a third set of nodes.

In some embodiments, the node 2 is configured to determine the configuration data for use in configuration by determining the configuration data received from highest number of nodes $3_1, \ldots, 3_N$; 4.

In various embodiments, the node 2 is configured to determine the configuration data for use in configuration by establishing a weight indicative of trust level of signaling received from each respective set of nodes $3_1, \ldots, 3_N$; 4. For instance, the new node 2 may receive new weights to apply. As another example, the new node 2 may receive new configuration data from first and second set of nodes $3_1, \ldots, 3_N$; 4 and apply the received weights when determining which nodes to rely on and which to consider configuration data from.

In a variation of the above embodiment, the node 2 is configured to determine a confidence level for the first and second configuration data based on the established weights.

In various embodiments, the node 2 is configured to determine one of the first and second configuration data further based on one or both of: physical location determination of the nodes of the one or more set of nodes $3_1, \ldots, 3_N$; 4 and radio signaling fingerprint determination of the nodes of the one or more sets of nodes $3_1, \ldots, 3_N$; 4.

In such embodiments, the determining one of the first and second configuration data for use is based on the number of nodes of each set of nodes and on one or both of physical location determination of the nodes and radio signaling fingerprint determination. In further embodiments, the described weights and/or confidence interval may also be used in the determination. There are thus various possible combinations on how to determine which configuration data to use.

In various embodiments, the node 2 is configured to determine the first number of nodes $3_1, \ldots, 3_N$ and the second number of nodes 4 by identifying each of the nodes $3_1, \ldots, 3_N$; 4 by determining a respective direction of signaling received from each of the nodes $3_1, \ldots, 3_N$; 4.

In various embodiments, the node 2 is configured to determine the first number of nodes $3_1, \ldots, 3_N$ and the second number of nodes 4 by identifying each of the nodes $3_1, \ldots, 3_N$; 4 based on audio signaling received from each of the nodes $3_1, \ldots, 3_N$; 4.

In various embodiments, the node 2 is configured to determine the first number of nodes $3_1, \ldots, 3_N$ and second number of nodes 4 by identifying for each node $3_1, \ldots, 3_N$; 4 a radio fingerprint based on signaling received from each of the nodes $3_1, \ldots, 3_N$; 4.

In various embodiments, the node 2 is configured to receive configuration data by receiving a hash value of the configuration data.

In a variation of the above embodiment, the node 2 is configured to determine by comparing the received hash values and determining the configuration data corresponding to the hash value received from highest number of nodes.

In various embodiments, the node 2 is configured to wake up from a sleep mode based on one of: recognizing a predefined trigger, a received wake-up signal and entering a wake-up period.

Figure 4:
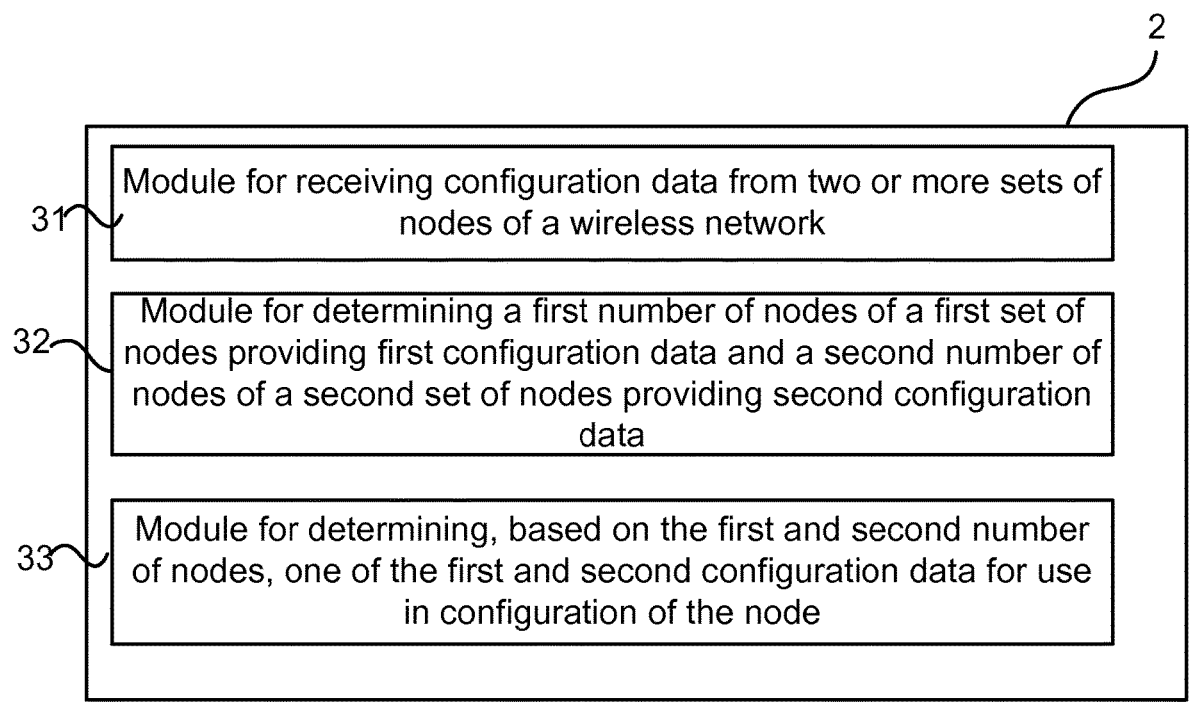
FIG. 4 illustrates a node comprising function modules/software modules for implementing embodiments of the present teachings.

FIG. 4 illustrates a node comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method 10 that has been described in various embodiments.

A node 2 for deployment in a wireless network 1 is provided. The node 2 comprises a first module 31 for receiving configuration data from two or more sets of nodes) of the wireless network 1. Such first module 31 may, for instance, comprise receiving circuitry or an input device.

The node 2 comprises a second module 32 for determining a first number of nodes of the first set of nodes providing first configuration data and a second number of nodes of the second set of nodes providing second configuration data. The second module 32 may, for instance, comprise processing circuitry adapted for determining a first number of nodes of a first set and a second number of nodes of a second set based on received input. The input may, as has been described, be or be based on unique fingerprint signaling, wherein the second module 32 is adapted to count number of unique fingerprint signaling containing first configuration data and count number of unique fingerprint signaling containing second configuration data.

The node 2 comprises a third module 33 for determining, based on the first and second number of nodes, one of the first and second configuration data for use in configuration of the node. The third module 33 may, for instance, comprise processing circuitry adapted for determining which configuration data to use. The third module 33 may take as input, the output from the second module 32 (i.e. first and second number). The input may be used in an algorithm implemented by the third module 33 to determine which configuration data to use. The algorithm may, for instance, be a simple comparison of which number is the highest and then use the configuration data corresponding to the highest number.

The node 2 may also comprise one or more modules for being capable of receiving and processing a combination of input, e.g. inputs such as configuration data and additional data from a third set of nodes.

It is noted that one or more of the modules 31, 32, 33 may be replaced by units.

The various embodiments and features according to the present teachings provide a number of advantages. An important advantage of the methods is that the addition of new nodes to a given deployment and their configuration can be done in a fully automatic way even in the presence of attackers. Our proposed solution does not require the deployment of a local enrollment server to provide nodes with network-level configuration data. Our proposed solution also avoids the need to pre-configure the address of a remote enrollment server to provide nodes with application-level configuration data.

The proposed solution works as long as an attacker is unable to deploy in the same area as many rogue nodes as there are good nodes in the system, which is a reasonable assumption to make in many types of IoT deployments. Please note that basing the consensus mechanism on other metrics such as having the highest processing power (instead of on number of nodes measured by their physical locations) would not be reasonable because an attacker with a single powerful device could have more processing power than a network with a high number of low-power sensors.

An attacker of a system that only uses physical location method and no radio fingerprinting techniques could deploy a single rogue node that transmits incorrect configuration data from one location, then moves to a different location, and then transmits the same incorrect configuration data from the new location pretending to be a different node. The proposed solution assumes that even by taking this type of mobile rogue node in consideration, the number of good nodes sending the correct configuration data will still be considerably higher. The assumption is reasonable since deploying that type of mobile rogue node will often be costlier than deploying several static rogue nodes.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for deployment of a node in a wireless network, the method comprising the node:
   receiving configuration data from two or more sets of nodes of the wireless network;
   determining a first number of nodes of the first set of nodes providing first configuration data and a second number of nodes of the second set of nodes providing second configuration data;
   determining, based on the first and second number of nodes, one of the first and second configuration data for use in configuration of the node, wherein determining the configuration data for use in configuration comprises determining the configuration data received from highest number of nodes; and
   establishing a weight indicative of trust level of signaling received from each respective set of nodes.

2. The method of claim 1, wherein the determining the configuration data is further based on data received from a third set of nodes.

3. The method of claim 1, further comprising determining a confidence level for the first and second configuration data based on the established weights.

4. The method of claim 1, wherein the determining one of the first and second configuration data is further based on:
   physical location determination of the nodes of the one or more set of nodes; and/or
   radio signaling fingerprint determination of the nodes of the one or more sets of nodes.

5. The method of claim 1, wherein the determining the first number of nodes and the second number of nodes comprises identifying each of the nodes by determining a respective direction of signaling received from each of the nodes.

6. The method of claim 1, wherein the determining the first number of nodes and the second number of nodes comprises identifying each of the nodes based on audio signaling received from each of the nodes.

7. The method of claim 1, wherein the determining the first number of nodes and second number of nodes comprises identifying for each node a radio fingerprint based on signaling received from each of the nodes.

8. The method of claim 1, wherein the receiving configuration data comprises receiving a hash value of the configuration data.

9. The method of claim 8, wherein the determining comprises:
   comparing the received hash values; and
   determining the configuration data corresponding to the hash value received from highest number of nodes.

10. The method of claim 1, wherein the node wakes up from a sleep mode based on: recognizing a predefined trigger, a received wake-up signal;
    and/or entering a wake-up period.

11. A non-transitory computer readable recording medium storing a computer program product for controlling a node in a wireless network for deployment of the node, the computer program product comprising software instructions which, when run on processing circuitry of the node, causes the node to:
    receive configuration data from two or more sets of nodes of the wireless network;
    determine a first number of nodes of the first set of nodes providing first configuration data and a second number of nodes of the second set of nodes providing second configuration data;
    determine, based on the first and second number of nodes, one of the first and second configuration data for use in configuration of the node, wherein determining the configuration data for use in configuration comprises determining the configuration data received from highest number of nodes; and
    establishing a weight indicative of trust level of signaling received from each respective set of nodes.

12. A node for deployment in a wireless network, the node comprising:
    processing circuitry;
    memory containing instructions executable by the processing circuitry whereby the node is operative to:
      receive configuration data from two or more sets of nodes of the wireless network;
      determine a first number of nodes of the first set of nodes providing first configuration data and a second number of nodes of the second set of nodes providing second configuration data;
      determine, based on the first and second number of nodes, one of the first and second configuration data for use in configuration of the node, wherein determining the configuration data for use in configuration comprises determining the configuration data received from highest number of nodes; and
      establishing a weight indicative of trust level of signaling received from each respective set of nodes.

* * * * *